United States Patent [19]

Miyagi

[11] Patent Number: 5,193,135
[45] Date of Patent: Mar. 9, 1993

[54] OPTICAL CONNECTOR AND ENDOSCOPE WITH OPTICAL CONNECTOR

[75] Inventor: Kunihiko Miyagi, Wako, Japan

[73] Assignee: Kabushiki Kaisha Machida Seisakusho, Tokyo, Japan

[21] Appl. No.: 772,674

[22] Filed: Oct. 7, 1991

[30] Foreign Application Priority Data

Oct. 31, 1990 [JP] Japan .................. 2-113490[U]

[51] Int. Cl.⁵ .................................. G02B 23/26
[52] U.S. Cl. ........................................ 385/117
[58] Field of Search .................... 385/115–120

[56] References Cited

U.S. PATENT DOCUMENTS

| | | | |
|---|---|---|---|
| 3,556,085 | 1/1971 | Takahashi | 385/117 X |
| 3,710,091 | 1/1973 | Holcomb | 240/2 MA |
| 3,724,383 | 4/1973 | Gallaghan et al. | 102/70.2 A |
| 4,307,934 | 12/1981 | Palmer | 350/96.20 |
| 4,378,952 | 4/1983 | Siegmund | 385/117 X |
| 4,799,754 | 1/1989 | Goldenberg | 350/96.18 |
| 4,807,958 | 2/1989 | Gunner et al. | 350/96.21 |
| 4,846,544 | 7/1989 | Bortolin et al. | 350/96.21 |
| 4,850,669 | 7/1989 | Welker et al. | 350/96.20 |
| 4,871,229 | 10/1989 | Tashiro | 385/117 |
| 4,895,138 | 1/1990 | Yabe | 385/117 X |
| 4,953,937 | 9/1990 | Kikachi et al. | 350/96.18 |
| 5,036,834 | 8/1991 | Sugiyama et al. | 385/117 X |

FOREIGN PATENT DOCUMENTS 57-47014   9/1979   Japan.
56-66908  10/1979   Japan.
62-32243   8/1987   Japan.

Primary Examiner—Akm E. Ullah
Attorney, Agent, or Firm—Fish & Richardson

[57] ABSTRACT

There is disclosed an optical connector for use in an endoscope. The optical connector includes a connector body for fixedly receiving one end portion of a light guide, and a retainer receiving an optical element. The retainer is threaded on the connector body to such an extent that an abutment surface of the retainer is abutted against a stopper surface of the connector body. An annular flange is formed on an inner periphery of the retainer adjacent to a distal open end of the retainer. The optical element and an annular elastic member are disposed between the flange of the retainer and a distal end surface of the connector body. The elastic member urges the optical element against the flange, thereby keeping the optical element away a predetermined distance from the one end of the light guide.

10 Claims, 3 Drawing Sheets

OPTICAL CONNECTOR AND ENDOSCOPE WITH OPTICAL CONNECTOR

BACKGROUND OF THE INVENTION

This invention relates to an optical connector and an endoscope provided with an optical connector.

An optical connector disclosed in FIG. 2 of U.S. Pat. No. 4,807,958 comprises a tubular connector body. One end portion of an optical fiber is inserted into and fixed to this connector body. A tubular retainer is threaded on the outer periphery of the connector body. This retainer has an annular flange formed on its inner periphery adjacent to its open distal end. A spherical lens (optical element) is received within the retainer. The spherical lens is disposed between the flange of the retainer and a conical surface formed on the distal end of the connector body, and is exposed to the exterior via the open distal end of the retainer. The retainer is threaded on the connector body until the spherical lens is brought into contact with the conical surface on the distal end of the connector body and the flange of the retainer, so that the spherical lens is firmly supported.

In the above optical connector, the spherical lens is firmly held between the flange of the retainer and the connector body, and therefore when the connector is not in use, the spherical lens exposed to the exterior, upon striking against a rigid object, may be damaged by an impact force. Also, there is a possibility that the spherical lens may be damaged by a thermal stress caused by the heat from a light source device. Although an O-ring of an elastic material is mounted within the retainer, this O-ring is used merely for sealing purposes, and does not perform any function of supporting the spherical lens.

An optical connector disclosed in U.S. Pat. No. 4,799,754 comprises a tubular connector body into which one end portion of an optical fiber is fixedly inserted, and a tubular retainer threaded on the outer periphery of the connector body. A flange is formed on the inner peripheral surface of the retainer intermediate the opposite ends thereof, and an annular holder plate is fixedly secured to the distal end surface of the retainer. Mounted within the retainer are a glass plate disposed between the flange and the holder plate, and a pair of O-rings disposed respectively on the opposite sides of the glass plate. In this optical connector, an impact against the glass plate can be absorbed by the pair of O-rings; however, since the glass plate is held between the pair of O-rings, the position of the glass plate relative to the end face of the optical fiber can not be maintained with high precision.

An endoscope disclosed in Japanese Laid-Open Patent Application No. 56-47014 comprises an endoscope body, a flexible insertion tube extending forwardly from the endoscope body and having at its distal end portion an illumination window and an inspection window, and a light guide tube extending laterally from the endoscope body. An optical connector of a cylindrical shape is attached to the distal end of the light guide tube. The endoscope further comprises an optical fiber bundle whose one end portion is inserted into and fixed to the optical connector. The optical fiber bundle is passed through the light guide tube, the endoscope body and the insertion tube, and is opposed at the other end thereof to the illumination window. As shown in FIG. 4 of the above publication, the optical connector comprises a tubular connector body into which the one end portion of the optical fiber bundle is fixedly inserted, a retainer threaded on the outer periphery of the connector body, and a cover glass plate fixedly mounted on an open distal end of the retainer. The cover glass plate serves to protect the one end face of the optical fiber bundle. The optical connector is inserted into a housing of a light source device, and in this inserted condition, the distal end of the optical connector is disposed in opposed relation to a light source. Illumination light from the light source is incident on the one end face of the optical fiber bundle via the cover glass plate, and is passed through the optical fiber bundle, and is emitted from the other end face of the optical fiber bundle into a body cavity via the illumination window.

In the optical connector of the above Japanese Laid-Open Patent Application No. 56-47014, also, since the cover glass plate is fixedly mounted on the retainer, this plate may be damaged upon striking against a rigid body or upon reception of a thermal stress. Constructions analogous to this optical connector are disclosed in Japanese Laid-Open Utility Model Application No. 56-66908 and Japanese Utility Model Publication No. 62-32243. In this Utility Model Publication No. 62-32243, instead of a cover glass plate, a fiber conduit is fixedly mounted on a retainer.

U.S. Pat. No. 4,953,937 discloses an endoscope in which a light guide tube is detachably connected to an endoscope body. Other prior art include U.S. Pat. Nos. 3,710,091, 3,724,383, 4,307,934, 4,846,544 and 4,850,669.

U.S. patent application Ser. No. 500,491 filed Mar. 28, 1990 and European Patent Application No. 90303515.2 (corresponding to this U.S. Patent Application) filed Apr. 2, 1990 disclose a connector for an endoscope which is analogous in construction to the present invention, but is not provided with an O-ring of an elastic material.

SUMMARY OF THE INVENTION

It is an object of this invention to provide an optical connector which reduces the possibility of damage to an optical element mounted on a distal end portion of the connector.

Another object of the invention is to provide an endoscope provided with such an optical connector.

According to one aspect of the present invention, there is provided an optical connector comprising:

(a) a tubular connector body having a stopper portion and a first threaded portion formed on an outer periphery of the connector body, one end portion of a light guide being adapted to be inserted in and fixed to the connector body;

(b) a tubular retainer including an abutment portion, a second threaded portion which is formed on an inner periphery of a proximal end portion of the retainer and is threadedly engaged with the first threaded portion, and a radially inwardly-directed annular flange formed on the inner periphery of the retainer adjacent to an open distal end of the retainer, the retainer being threaded on the connector body to such an extent that the abutment portion is abutted against the stopper portion of the connector body;

(c) an optical element received in the retainer and disposed between the flange of the retainer and the one end face of the light guide; and (d) an annular elastic member received in the retainer and disposed between the optical element and a distal end surface of the connector body, the elastic member urging the optical element against the flange of the retainer, thereby keeping the optical element away a predetermined distance from the one end face of the light guide.

According to another aspect of the invention, there is provided an endoscope comprising an endoscope body; an insertion tube extending from the endoscope body and having an illumination window at its distal end; a light guide tube detachably connected at its proximal end to the endoscope body, a first light guide passing through the light guide tube; a second light guide passing through the endoscope body and the insertion tube and opposed at its one end to the illumination window; a first optical connector mounted on a distal end of the light guide tube; a second optical connector mounted on the proximal end of the light guide tube; and a third optical connector mounted on the endoscope body; one end of the first light guide being connected to the first optical connector, the other end of the first light guide being connected to the second optical connector, the other end of the second light guide being connected to the third optical connector, the second and third optical connectors being detachably connected together, light from a light source passing through the first optical connector, the first light guide, the second optical connector, the third optical connector, the second light guide and the illumination window to be radiated to the exterior of the endoscope, and the second optical connector comprising:

(a) a first tubular connector body having a radially-directed annular stopper surface, and a first threaded portion formed on an outer periphery of the connector body, the other end portion of the first light guide being inserted in and fixed to the connector body;

(b) a first tubular retainer including a radially-directed annular abutment surface, a second threaded portion which is formed on an inner periphery of a proximal end portion of the retainer and is threadedly engaged with the first threaded portion, and a radially inwardly-directed annular flange formed on the inner periphery of the retainer adjacent to an open distal end of the retainer, the retainer being threaded on the connector body to such an extent that the abutment surface is abutted against the stopper surface of the connector body;

(c) a first optical element received in the retainer and disposed between the flange of the retainer and the other end face of the first light guide; and (d) a first annular elastic member received in the retainer and disposed between the optical element and a distal end surface of the connector body, the elastic member urging the optical element against the flange of the retainer, thereby keeping the optical element away a predetermined distance from the other end face of the first light guide.

DESCRIPTION OF THE PREFERRED EMBODIMENTS

Preferred embodiments of the present invention will now be described with reference to the drawings.

Figure 1:
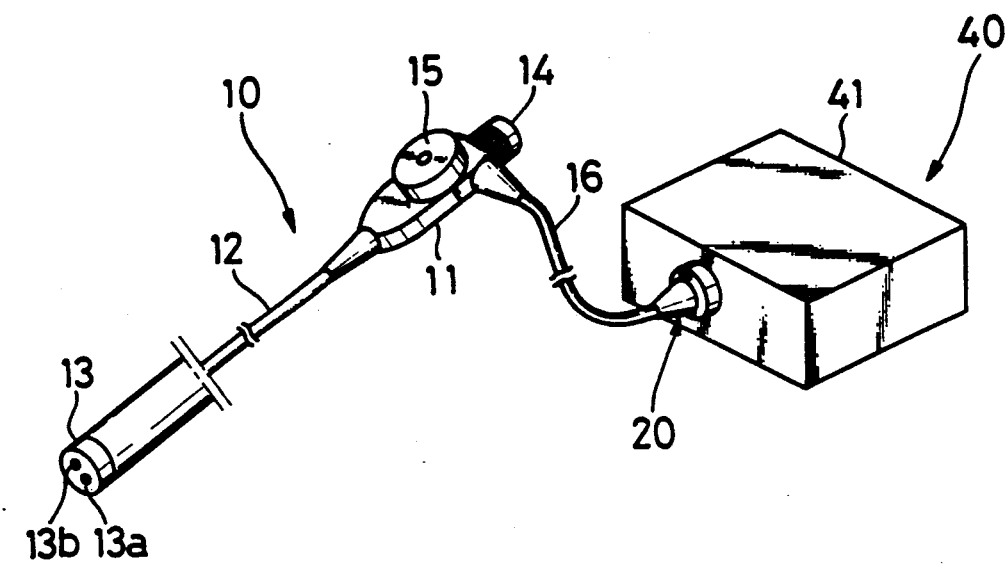
FIG. 1 is a perspective view showing an endoscope according to the present invention and a light source device.

FIG. 1 shows an endoscope 10 and a light source device 40. The endoscope 10 comprises an endoscope body 11, a flexible insertion tube 12 extending from the front end of the endoscope body 11, a rigid portion (rigid tip member) 13 mounted on the distal end of the insertion tube 12, an ocular portion 14 mounted on the rear end of the endoscope body 11, a manipulation dial 15 mounted on one side of the endoscope body 11 so as to bend the distal end portion of the insertion tube 12, and a flexible light guide tube 16 of a resin extending laterally from the endoscope body 11. The distal end portion of the insertion portion 12 is shown in an enlarged manner in FIG. 1. The rigid portion 13 has an illumination window 13a and an inspection window 13b. The inspection window 13b is optically connected to the ocular portion 14 via an image-transmitting optical system including a bundle of optical fibers.

Figure 2:
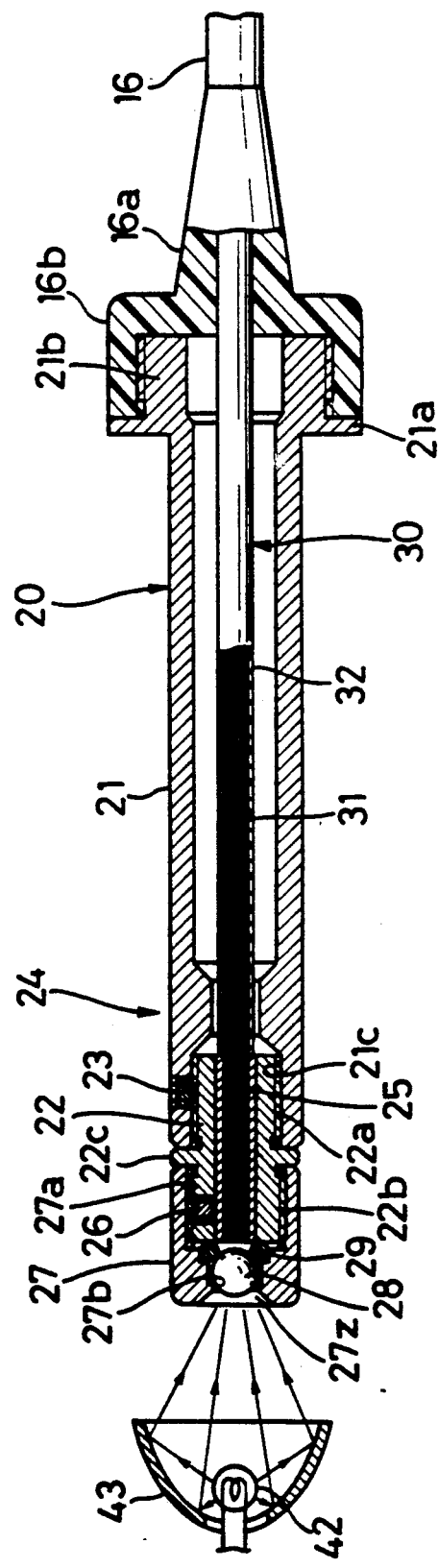
FIG. 2 is a cross-sectional view of an optical connector connected to a distal end of a light guide tube of the endoscope.

As shown in FIGS. 1 and 2, the endoscope 10 further comprises a connector 20 connected to the distal end of the light guide tube 16, and a light guide 30. The light guide 30 comprises an optical fiber bundle 31, and a tube 32 of a resin covering the optical fiber bundle 31. One end portion of the light guide 30 is inserted into and fixed to the connector 20, as will be more fully described later. The light guide 30 is passed through the light guide tube 16, the endoscope body 11 and the insertion tube 12, and is opposed at the other end thereof to the illumination window 13a.

Figure 3:
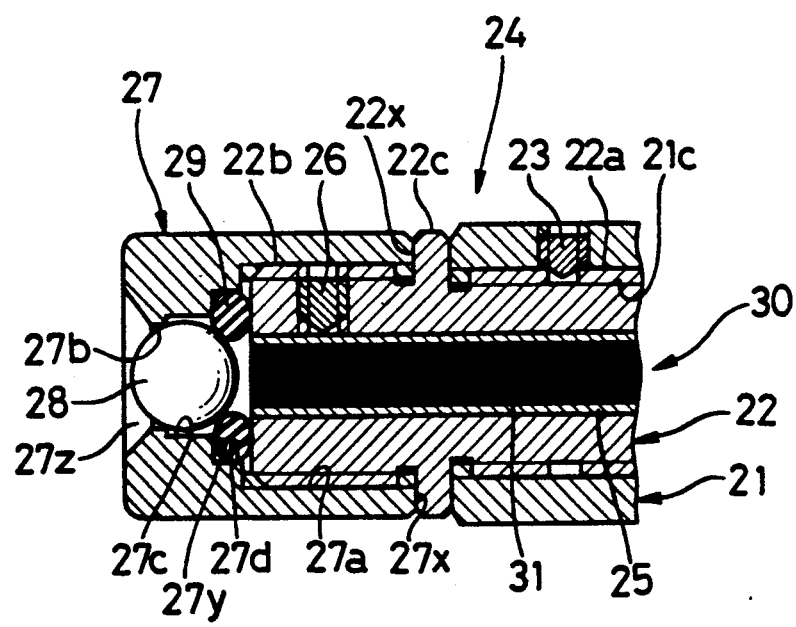
FIG. 3 is an enlarged cross-sectional view of a distal end portion of the optical connector.

Next, the construction of the connector 20 will be descried in detail with reference to FIGS. 2 and 3. The connector 20 comprises a main cylindrical member 21 which is straight and rigid. The main cylindrical member 21 has a positioning flange 21a at its proximal end portion, and a tubular connection portion 21b extending rearwardly from the flange 21a. The light guide tube 16 has at its distal end portion a reinforcement portion 16a thickened progressively toward the distal end of the light guide tube 16, and a tubular connection portion 16b formed at the distal end of the reinforcement portion 16a. This connection portion 16b is threadedly connected onto the connection portion 21b of the connector 20. A threaded portion 21c is formed on the inner peripheral of the distal end portion of the main cylindrical member 21.

The connector 20 further comprises an auxiliary cylindrical member 22. The auxiliary cylindrical member 22 has two threaded portions 22a and 22b which are formed on the outer periphery thereof and are spaced from each other along the axis thereof, and an annular flange 22c formed on the outer periphery thereof and disposed between the two threaded portions 22a and 22b. The threaded portion 22a of the auxiliary cylindrical member 22 is threaded into the threaded portion 21c of the main cylindrical member 21, so that the auxiliary cylindrical member 22 is connected to the main cylindrical member 21 in coaxial relation thereto. This connection condition is positively maintained by a tightening screw 23 threaded through the peripheral wall of the main cylindrical member 21 and engaged with the auxiliary cylindrical member 22. The auxiliary cylindrical member 22 is threaded into the main cylindrical member 21 until the rear surface of the flange 22c is abutted against the distal end surface of the main cylindrical member 21. The main cylindrical member 21 and the auxiliary cylindrical member 22 jointly constitute a connector body 24.

The one end portion of the light guide 30 is fixedly secured to the inner periphery of the auxiliary cylindrical member 22. More specifically, one end portion of the tube 32 is removed or stripped from the light guide 30 over a length generally equal to the length of the auxiliary cylindrical member 22. One end portion of the optical fiber bundle 31 from which the tube 32 has been removed is inserted into a reinforcement tube 25. The reinforcement tube 25 is bonded to the optical fiber bundle 31 by an adhesive, and the optical fibers of this bundle 31 are bound together by an adhesive. The reinforcement tube 25 is inserted into the auxiliary cylindrical member 22, and is fixed thereto by a tightening screw 26 threaded through the peripheral wall of the auxiliary cylindrical member 22 and engaged with the reinforcement tube 25. With this arrangement, the one end portion of the light guide 30 is fixedly secured to the auxiliary cylindrical member 22 in coaxial relation thereto. The one end face of the optical fiber bundle 31 lies flush with the distal end surfaces of the auxiliary cylindrical member 22 and reinforcement tube 25.

The connector 20 further comprises a tubular retainer 27. The inner diameter of the retainer 27 decreases from its proximal end toward its distal end opening 27z in a stepped manner. A threaded portion 22a is formed on the inner periphery of the proximal end portion of the retainer 27, and is threaded on the threaded portion 22b of the auxiliary cylindrical member 22 projected from the distal end of the main cylindrical member 21, so that the retainer 27 is connected to the auxiliary cylindrical member 22 in coaxial relation thereto. As best shown in FIG. 3, a radially inwardly-directed annular flange 27b is formed on the inner periphery of the retainer 27 immediately adjacent to the distal end opening 27z. That portion of the interior of the retainer 27 lying between the flange 27b and the threaded portion 27a serves as a first receiving portion 27c and a second receiving portion 27d greater in diameter than the first receiving portion 27c.

The connector 20 further comprises a spherical lens (convex lens) 28, and an O-ring (elastic member) 29 of a circular transverse cross-section made of an elastic material such as rubber. The spherical lens 28 is received in the first receiving portion 27c of the retainer 27, and the O-ring 29 is received in the second receiving portion 27d. The diameter of the first receiving portion 27c is greater than that of the spherical lens 28.

The retainer 27 holding the spherical lens 28 and the O-ring 29 is threaded on the auxiliary cylindrical member 22 until its rear end surface (abutment surface) 27x is abutted against a front surface (stopper surface) 22x of the flange 22c. The O-ring 29 is held between the distal end surface of the auxiliary cylindrical member 22, a step or shoulder 27y, formed between the first and second receiving portions 27c and 27d, and the spherical lens 28, so that the O-ring 29 is elastically deformed. In other words, the elastic force of the O-ring 29 acts on spherical lens 28 to urge the same against the flange 27b of the retainer 27.

As described above, the rear end surface 27x of the retainer 27 is abutted against the front surface 22x of the flange 22c, and the spherical lens 28 is abutted against the flange 27b. With this arrangement, the spherical lens 28 is kept spaced a predetermined distance from the one end face of the optical fiber bundle 31.

As shown in FIGS. 1 and 2, the light source device 40 comprises a housing 41, a lamp (light source) 42 mounted at a predetermined position within the housing 41, a concave mirror 43 mounted within the housing 41 so as to converge illumination light emitted from the lamp 42. The housing 41 has an insertion hole (not shown) into which the connector 20 is inserted, and a guide means mounted in the vicinity of this insertion hole so as to guide the inserted connector 20. The connector 20 is inserted into the housing 41, with the flange 21a held against the side surface of the housing 41, and in this condition the distal end of the connector 20 is disposed in opposed relation to the lamp 42. Also, in this condition, the longitudinal axis (centerline) of the connector 20 is aligned with the optical axis of the illumination light emitted from the lamp 42.

The operation of the connector 20 of the above construction will now be described in detail. The illumination light, emitted from the lamp 42 and converged by the concave mirror 43, is incident on the spherical lens 28, so that the illumination light is further converged by the spherical lens 28 and is incident on the one end face of the optical fiber bundle 31. Then, the illumination light passes through the optical fiber bundle 31, and is emitted from the other end face of this optical fiber bundle 31 to the exterior of the endoscope 10 via the illumination window 13a in a diverging manner.

In the condition in which the connector 20 is disconnected from the light source device 40, when the spherical lens 28 of the connector 20 strikes against a rigid object, this impact can be absorbed by the elastic deformation of the O-ring 29, and therefore the possibility of damage to the spherical lens 28 can be reduced to a minimum. Since a thermal expansion of the spherical lens 28 can be absorbed by the elastic deformation of the O-ring 29, damage due to the thermal expansion can also be prevented. The O-ring 29 also performs a sealing function.

Figure 4:
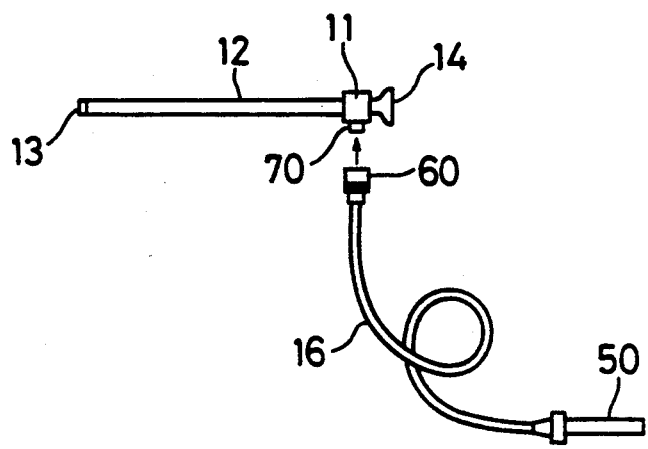
FIG. 4 is a side-elevational view of a modified endoscope.
Figure 5:
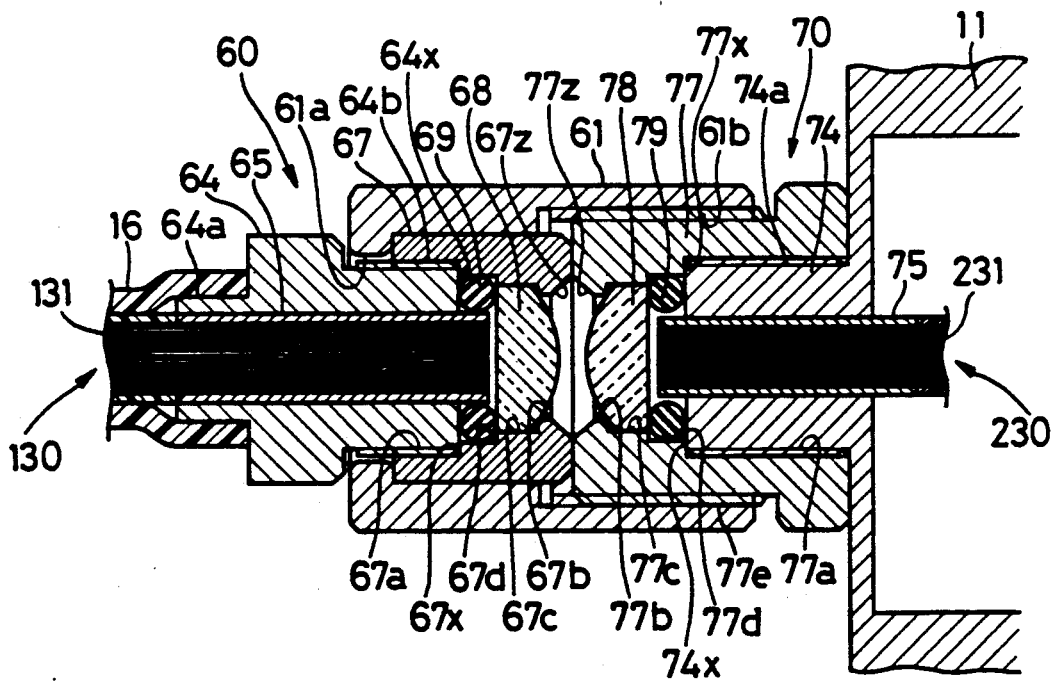
FIG. 5 is a cross-sectional view showing a construction of connection between an endoscope body of FIG. 4 and a light guide tube.

FIGS. 4 and 5 show a modified endoscope. Those portions of these Figures corresponding to those of FIGS. 1 to 3 are designated by identical reference numerals, respectively, and explanation thereof will be omitted. In this endoscope, a light guide tube 16 is detachably connected at its proximal end to an endoscope body 11. A first light guide 130 is inserted into the light guide 16. A second light guide 230 is received in the endoscope body 11 and a flexible insertion tube 12. A first optical connector 50 and a second optical connector 60 are mounted on the distal end and proximal end of the light guide tube 16, respectively. A third optical connector 70 is mounted on the endoscope body 11. The first light guide 130 is connected at one end thereof to the first optical connector 50, and is connected at the other end thereof to the second optical connector 60. The second light guide 230 is opposed at one end thereof to an illumination window, and is connected at the other end thereof to the third optical connector 70.

The first optical connector 50 is, for example, identical in construction to the optical connector 20 of FIG. 1 except that the spherical lens 28 is replaced by a cylindrical fiber conduit.

The second optical connector 60 comprises a connector body 64, a retainer 67, a convex lens (optical element) 68, and an O-ring (elastic member) 69 made of an elastic material. The connector body 64 has at its proximal end portion a tubular connection portion 64a to which the proximal end portion of the light guide tube 16 is connected. A threaded portion 64b is formed on the outer periphery of the distal end portion of the connector body 64. One end portion of an optical fiber bundle 131 of the first light guide 130 is inserted into and fixed to the connector body 64 through a reinforcement tube 65. The end surfaces of the reinforcement tube 25 and optical fiber bundle 131 are projected from a distal end surface 64x of the connector body 64. The retainer 67 is similar in construction to the retainer of FIGS. 1 and 2, and therefore detailed explanation is omitted here. Briefly, the retainer 67 includes a distal end opening 67z, a threaded portion 67a, an annular flange 67b, a first receiving portion 67c, and a second receiving portion 67d. The convex lens 68 is received in the first receiving portion 67c. The O-ring 69 is provided around the outer periphery of the projected end portion of the reinforcement tube 65, and is received in the second receiving portion 67d. The retainer 67 is threaded on the connector body 64 until a step or shoulder (abutment surface) 67x between the threaded portion 67a and the second receiving portion 67d is abutted against the distal end surface (stopper surface) 64x of the connector body 64, so that the O-ring 69 is held between the distal end surface 64x of the connector body 64 and the convex lens 68 to be elastically deformed. The convex lens 68 is urged against the flange 67b by this elastic force of the O-ring 69.

The second optical connector 60 further comprises a connection tube 61. The connection tube 61 has at its proximal end a radially inwardly-directed flange 61a, and has a threaded portion 61b formed on the inner periphery of its distal end portion.

The third optical connector 70 comprises a tubular portion (connector body) 74 formed integrally with and projecting exteriorly of the endoscope body 11, a retainer 77, a convex lens 78, and an O-ring (elastic member) 79. An optical fiber bundle 231 of the second light guide 230 is fixedly inserted into the tubular portion 74 through a reinforcement tube 75. A threaded portion 74a for connecting the retainer 77 to the tubular portion 74 is formed on the outer periphery of the tubular portion 74. A distal end face 74x of the tubular portion 74 serves as a stopper surface. Like the retainer 67 of the second optical connector 60, the retainer 77 includes a distal end opening 77z, a threaded portion 77a, an annular flange 77b, a first receiving portion 77c, a second receiving portion 77d and an abutment surface 77x. The retainer 77 further includes a threaded portion 77e at its outer periphery.

The connection tube 61 is threaded on the retainer 77 until the distal end surface of the retainer 67 of the second optical connector 60 is abutted against the distal end surface of the retainer 77 of the third optical connector 70 and also until the proximal end surface of the retainer 67 is abutted against the flange 61a of the connection tube 61. By doing so, the two optical connectors 60 and 70 are connected together. In this connection condition, the two convex lenses 68 and 78 are disposed in opposed relation to each other. Converged illumination light from a light source passes through the first optical connector 50 and the first light guide 130, and the diverging illumination light from the other end of the first light guide 130 is converted into generally parallel rays of light by the convex lens 68 of the second optical connector 60, and then is again converged by the convex lens 78 of the third optical connector 70, and is incident on the other end of the second light guide 230, and is emitted from the one end of the second light guide 230 to the exterior via the illumination window.

The present invention is not limited to the above embodiments, and various modifications can be made. The optical element of each optical connector may be a flat glass plate. The elastic member may be a ring of a non-circular transverse cross-section, or a coil spring in which case this coil spring may be made of a shape memory alloy.

What is claimed is:

1. An optical connector comprising:
   (a) a tubular connector body having a stopper portion and a first threaded portion formed on an outer periphery of said connector body, one end portion of a light guide being adapted to be inserted in and fixed to said connector body;
   (b) a tubular retainer including an abutment portion, a second threaded portion which is formed on an inner periphery of a proximal end portion of said retainer and is threadedly engaged with said first threaded portion, and a radially inwardly-directed annular flange formed on the inner periphery of said retainer adjacent to an open distal end of said retainer, said retainer being threaded on said connector body to such an extent that said abutment portion is abutted against said stopper portion of said connector body;
   (c) an optical element received in said retainer and disposed between said flange of said retainer and the one end face of said light guide; and
   (d) an annular elastic member received in said retainer and disposed between said optical element and a distal end surface of said connector body, said elastic member urging said optical element against said flange of said retainer, thereby keeping said optical element away a predetermined distance from the one end face of said light guide.

2. An optical connector according to claim 1, in which said elastic member comprises an O-ring.

3. An optical connector according to claim 1, in which said stopper portion of said connector body has a radially-directed annular stopper surface, said abutment portion of said retainer having a radially-directed annular abutment surface.

4. An optical connector according to claim 3, in which said connector body includes:
   (i) an elongated main cylindrical member; and
   (ii) an auxiliary cylindrical member threaded into a distal end portion of said main cylindrical member in coaxial relation thereto, the one end portion of said light guide being adapted to be inserted in and fixed to an inner periphery of said auxiliary cylindrical member, said first threaded portion being formed on an outer periphery of a distal end portion of said auxiliary cylindrical member, an annular flange being formed on the outer periphery of said auxiliary cylindrical member intermediate the opposite ends of said auxiliary cylindrical member, a front surface of said flange of said auxiliary cylindrical member serving as said stopper surface, and the proximal end surface of said retainer serving as said abutment surface held against said stopper surface.

5. An optical connector according to claim 3, in which said abutment surface is formed on the inner periphery of said retainer intermediate the opposite ends of said retainer, the distal end surface of said connector body serving as said stopper surface held against said abutment surface.

6. An optical connector according to claim 3 for use in an endoscope comprising an endoscope body, an insertion tube extending from said endoscope body and having an illumination window at its distal end, and a light guide tube extending from said endoscope body, said optical connector being adapted to be attached to a distal end of said light guide tube so as to be optically connected to a light source, said endoscope further comprising said light guide including an optical fiber bundle, said light guide being connected at its one end portion to said optical connector and passed through said light guide tube, said endoscope body and said insertion tube, and opposed at the other end thereof to said illumination window, and illumination light from said light source passing through said optical element, said light guide and said illumination window to be radiated to the exterior of said endoscope.

7. An endoscope comprising an endoscope body; an insertion tube extending from said endoscope body and having an illumination window at its distal end; a light guide tube detachably connected at its proximal end to said endoscope body; a first light guide passing through said light guide tube; a second light guide passing through said endoscope body and said insertion tube and opposed at its one end to said illumination window; a first optical connector mounted on a distal end of said light guide tube; a second optical connector mounted on the proximal end of said light guide tube; and a third optical connector mounted on said endoscope body; one end of said first light guide being connected to said first optical connector, the other end of said first light guide being connected to said second optical connector, the other end of said second light guide being connected to said third optical connector, said second and third optical connectors being detachably connected together, light from a light source passing through said first optical connector, said first light guide, said second optical connector, said third optical connector, said second light guide and said illumination window to be radiated to the exterior of said endoscope, and
said second optical connector comprising:
(a) a first tubular connector body having a radially-directed annular stopper surface, and a first threaded portion formed on an outer periphery of said connector body, the other end portion of said first light guide being inserted in and fixed to said connector body;
(b) a first tubular retainer including a radially-directed annular abutment surface, a second threaded portion which is formed on an inner periphery of a proximal end portion of said retainer and is threadedly engaged with said first threaded portion, and a radially inwardly-directed annular flange formed on the inner periphery of said retainer adjacent to an open distal end of said retainer, said retainer being threaded on said connector body to such an extent that said abutment surface is abutted against said stopper surface of said connector body;
(c) a first optical element received in said retainer and disposed between said flange of said retainer and the other end face of said first light guide; and
(d) a first annular elastic member received in said retainer and disposed between said optical element and a distal end surface of said connector body, said elastic member urging said optical element against said flange of said retainer, thereby keeping said optical element away a predetermined distance from the other end face of said first light guide.

8. An endoscope according to claim 7, in which said third optical connector comprising:
(a) a second connector body mounted on said endoscope body and having a tubular portion extending exteriorly of said endoscope body, the other end portion of said second light guide being inserted in and fixed to said tubular portion, a third threaded portion being formed on an outer periphery of said tubular portion, said second connector body having a radially-directed annular stopper surface;
(b) a second tubular retainer including a radially-directed annular abutment surface, a fourth threaded portion which is formed on an inner periphery of a proximal end portion of said second retainer and is threadedly engaged with said third threaded portion, and a radially inwardly-directed annular flange formed on the inner periphery of said second retainer adjacent to an open distal end of said second retainer, said second retainer being threaded on said second connector body to such an extent that said abutment surface of said second retainer is abutted against said stopper surface of said second connector body;
(c) a second optical element received in said second retainer and disposed between said flange of said second retainer and the other end face of said second light guide; and
(d) a second annular elastic member received in said second retainer and disposed between said second optical element and a distal end surface of said tubular portion, said second elastic member urging said second optical element against said flange of said second retainer, thereby keeping said second optical element away a predetermined distance from the other end face of said second light guide.

9. An endoscope according to claim 8, in which each of said first and second light guides includes an optical fiber bundle, each of said first and second optical elements comprising a convex lens, and each of said first and second elastic members comprising an O-ring.

10. An endoscope according to claim 8, in which a fifth threaded portion is formed on an outer periphery of said second retainer of said third optical connector, said second optical connector including a connection tube, said connection tube having a flange formed on an inner periphery of a proximal end portion thereof, and a sixth threaded portion formed on the inner periphery of a distal end portion thereof, the proximal end portion of said connection tube receiving said first retainer of said second optical connector, said sixth threaded portion of said connection tube being threaded on said fifth threaded portion of said second retainer of said third optical connector, the proximal end surface of said first retainer of said second optical connector being abutted against said flange of said connection tube, and the distal end surface of said first retainer being abutted against the distal end surface of said second retainer of said third optical connector, so that said second and third optical connectors are connected together in such a manner that said first and second optical elements are disposed in opposed relation to each other.

* * * * *